US012352710B2

United States Patent
Saito

(10) Patent No.: US 12,352,710 B2
(45) Date of Patent: Jul. 8, 2025

(54) SIGNAL PROCESSING DEVICE FOR X-RAY ANALYSIS

(71) Applicant: SHIMADZU CORPORATION, Kyoto (JP)

(72) Inventor: Yuta Saito, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 217 days.

(21) Appl. No.: 18/274,611

(22) PCT Filed: Jul. 29, 2021

(86) PCT No.: PCT/JP2021/028104
§ 371 (c)(1),
(2) Date: Jul. 27, 2023

(87) PCT Pub. No.: WO2022/162976
PCT Pub. Date: Aug. 4, 2022

(65) Prior Publication Data
US 2024/0094149 A1 Mar. 21, 2024

(30) Foreign Application Priority Data
Jan. 27, 2021 (JP) .................................. 2021-010814

(51) Int. Cl.
*G01N 23/223* (2006.01)
(52) U.S. Cl.
CPC ..... *G01N 23/223* (2013.01); *G01N 2223/304* (2013.01)
(58) Field of Classification Search
CPC .................. G01N 23/223; G01N 2223/304
See application file for complete search history.

(56) References Cited

U.S. PATENT DOCUMENTS

2005/0230632 A1   10/2005   Montemont et al.

FOREIGN PATENT DOCUMENTS

| JP | 2015-021957 A | 2/2015 |
| JP | 2020-051900 A | 4/2020 |

OTHER PUBLICATIONS

JP 2015-021957 A and its English translation (Year: 2015).*
(Continued)

*Primary Examiner* — Chih-Cheng Kao
(74) *Attorney, Agent, or Firm* — Muir Patent Law, PLLC

(57) ABSTRACT

Provided is a signal processing device for X-ray analysis capable of suppressing effects of increased background due to pile-up signals and suppressing the dead time from lengthening. A signal processing device for X-ray analysis includes a differentiating circuit configured to convert a plurality of staircase wave signals detected by the X-ray detector into differential wave signals, a digital filter configured to convert the differential wave signals into trapezoidal wave signals or triangular wave digital signals, and a peak detection unit configured to discriminate and count a peak value extracted from a peak portion of the trapezoidal wave signal or the triangular wave signal. The peak detection unit is set such that a rising threshold Tu to be compared with a signal of the rising-side sloped line segment and a falling threshold Td to be compared with a signal of the falling-side sloped line segment in the trapezoidal signal or the triangular wave signal have a relation of Tu>Td. The peak detection unit selects the trapezoidal signal or the triangular wave signal to be counted from the converted trapezoidal signal or the converted triangular wave signal based on the rising threshold Tu, and terminates detection of the peak portion of the trapezoidal signal or the triangular wave signal based on the falling threshold Td.

2 Claims, 4 Drawing Sheets

(56) References Cited

OTHER PUBLICATIONS

JP 2020-051900 A and its English translation (Year: 2020).*
WO 2019/064824 A1 and its English translation (Year: 2019).*
JP 2021-004779 A and its English translation (Year: 2021).*
Extended European Search Report dispatched on Nov. 25, 2024 for the European Patent Application No. 21922984.6 from the European Patent Office.
Written Opinion of the International Searching Authority for PCT application No. PCT/JP2021/028104 dated Oct. 5, 2021.

\* cited by examiner

SIGNAL PROCESSING DEVICE FOR X-RAY ANALYSIS

TECHNICAL FIELD

The present invention relates to a signal processing device for X-ray analysis, and more particularly to a signal processing device for X-ray analysis provided with a waveform conversion digital filter for converting differential waves.

BACKGROUND ART

An X-ray fluorescence analyzer irradiates a solid sample, a powder sample, or a liquid sample with excitation X-rays (primary X-rays) and detects fluorescence X-rays emitted by being excited by the irradiated primary X-rays with a spectrometer to perform qualitative or quantitative analysis of elements contained in the sample. As such an X-ray fluorescence analyzer, there exists a wavelength-dispersive type X-ray fluorescence analyzer and an energy-dispersive type X-ray fluorescence analyzer.

The wavelength-dispersive type X-ray fluorescence analyzer is configured to select fluorescence X-rays of a specific wavelength by an X-ray spectrometer in which a dispersive crystal and a slit are combined and then detect them with a detector. On the other hand, an energy-dispersive type X-ray fluorescence analyzer has a configuration in which fluorescence X-rays are directly detected by a semiconductor detector or the like without performing such a wavelength selection, and thereafter, the output signal is processed to separate it for each wavelength $\lambda$ (i.e., X-ray energy E) (see, for example, Patent Documents 1 and 2). Therefore, when generating an X-ray fluorescence spectrum, a wavelength-dispersive type X-ray fluorescence analyzer requires wavelength scanning, whereas an energy-dispersive type X-ray fluorescence analyzer can obtain information on numerous wavelengths simultaneously, making it possible to obtain an X-ray fluorescence spectrum in a short period of time.

FIG. 3 is a schematic configuration diagram showing a configuration of a conventional ordinary energy-dispersive type X-ray fluorescence spectrometer. The energy-dispersive type X-ray fluorescence analyzer 101 is provided with an X-ray tube 10 that emits primary X-rays toward a sample S, an energy-dispersive type spectrometer 30 (also referred to as a "detector") that detects X-ray fluorescence intensity I, a preamplifier 41, a differentiating circuit 42 composed of a capacitor C and a resistor R, an A/D converter 43, a processing device for X-ray analysis called an FPGA (Field-programmable gate array) 160 composed of a waveform conversion digital filter 61, a peak detection unit 62, and a histogram memory 63, and a CPU 150 that controls the X-ray tube 10, the energy-dispersive spectrometer 30, the FPGA 160, and other devices.

The X-ray tube 10 is configured to cause thermal electrons emitted from a filament to collide with an end surface of a target by applying a high voltage to the target and a low voltage to the filament to thereby emit primary X-rays generated at the end surface of the target.

In the energy-dispersive type spectrometer 30, for example, a detection element (lithium-drift type Si semiconductor detector) for detecting X-ray fluorescence intensity I is arranged inside a housing. The output signal from the energy-dispersive type spectrometer 30 is amplified by the preamplifier 41. The output signal is in the form of a staircase wave in which each step of the staircase wave indicates that fluorescence X-rays are detected, and the height (wave height) of each step represents the wavelength $\lambda$, i.e., the X-ray energy E.

The output signal amplified by the preamplifier 41 is sent to the differentiating circuit 42, and the differentiating circuit 42 converts the staircase wave into a differential waveform as shown in the following Formula (1). By converting from the staircase wave to the differential wave as described above, a wide dynamic range can be secured, and high resolution can be achieved.

$$y = \exp(-nT/\tau) = a^n \tag{1}$$

where "$\tau$" is an RC time constant, "T" is a sampling period, "n" is the number of samples, and "a" is a time constant ($\exp(-T/\tau)$).

The A/D converter 43 converts the differential wave input as an analog signal into a differential digital signal and inputs it to the waveform conversion digital filter 61 in the FPGA 160. The waveform conversion digital filter 61 converts the input differential wave digital signal into a trapezoidal wave digital signal using the transfer function shown in Formula (2) below, as shown in FIG. 4. By converting a differential wave digital signal to a trapezoidal wave digital signal as described above, the peak of the peak value (peak top value) can be accurately calculated.

$$h(z) = \frac{1 - az^{-1}}{1 - 2z^{-1} + z^{-2}} \left\{ \frac{1 - z^{-N} - z^{-(N+M)} + z^{-(2*N+M)}}{N} \right\} \tag{2}$$

Note that in the above-described Formula, "M" denotes a trapezoidal wave top time (time of the upper-side line segment) and "N" denotes a trapezoidal wave rise/fall time.

FIG. 5 is a waveform diagram schematically showing the differential waveform digital signal input to the waveform conversion digital filter 61 and the trapezoidal waveform digital signal output after the waveform is converted by the waveform conversion digital filter 61. When staircase wave signals of various sizes are detected by the detector 30 at irregular time intervals, differential wave digital signals of various sizes are input one after another at irregular time intervals to the waveform conversion digital filter 61 via the differentiating circuit 42 and the A/D converter 43, and trapezoidal wave digital signals with corresponding peak values are generated. When the counting rate by the detector 30 is low, and the time interval between input differential digital signals is long (low density), the trapezoidal digital signals are generated separately. However, when the counting rate is high, and the time interval between input differential digital signals is short (high density), a trapezoidal digital signal in which the trapezoidal digital signals overlap (referred to as "piled-up") at the falling-side sloped line segment is generated.

The peak detection unit 62 detects the peak of the trapezoidal wave digital signal to obtain the peak value (peak top value) of the peak and increments the count value of the X-ray energy E corresponding to the peak top value each time one peak is detected, and stores the count value in the histogram memory 63.

Then, by sending the stored data to the CPU 150, the CPU 150 generates a wave height distribution diagram (energy spectrum histogram) with the horizontal axis as the X-ray fluorescence energy E and the vertical axis as the content (intensity) of the element determined from the counts.

PRIOR ART DOCUMENT

Patent Document

Patent Document 1: Japanese Patent Application Publication No. 2015-21957
Patent Document 2: Japanese Patent Application Publication No. 2020-51900

SUMMARY OF THE INVENTION

Problem to be Solved by the Invention

In the energy-dispersive type X-ray fluorescence analyzer 101 described above, the peak detection unit 62 detects the upper-side line segment (top-line segment) that is the peak of the trapezoidal wave digital signal and obtains a single point included in the upper-side line segment (for example, the upper-side line segment start point, which is the bending point from the rising-side sloped line segment to the upper-side line segment) or the average value of a plurality of points included in the upper-side line segment to extract it as the peak top value (peak value). However, when even small noise fluctuations are mistakenly counted as the peaks of the trapezoidal digital signal, it becomes difficult to obtain an accurate energy spectrum.

Therefore, in order to remove the influence of noise, the applicant sets a peak detection threshold T in the peak detection unit 62, and in a case where it is a trapezoidal wave digital signal in which the shift amount (amount of increase) of the rising-side sloped line segment of the trapezoidal digital signal and the shift amount (amount of decrease) of the wave height at the falling-side sloped line segment of the trapezoidal wave digital signal fluctuates with a magnitude equal to or greater than the threshold T, it is recognized as a trapezoidal digital signal to be counted as one, and the peak top value is extracted from the upper-side line segment, and the count value of the X-ray energy E corresponding to the peak top value is incremented and stored in the histogram memory 63.

Specifically, for a trapezoidal digital signal (see FIG. 5, for example) input to the peak detection unit 62, when the signal change of the rising-side sloped line segment in which the signal increases exceeds the threshold T, it is recognized as a first trapezoidal digital signal to be counted, and the subsequent upper-side line segment in which the signal change is flat is detected as a peak, and the peak top value is extracted. Further, the signal change of the falling-side sloped line segment in which the signal decreases from the upper-side line segment (peak top value) is detected. When the shift amount (amount of decrease) from the upper-side line segment (peak top value) exceeds the threshold T, it is recognized that the first trapezoidal digital signal is over at that time point, and the process for detecting the signal change on the rising-side of a second trapezoidal wave signal is initiated.

In other words, when the amount of decrease of the falling signal change exceeds a threshold T, it is considered that the dead time of the first trapezoidal digital signal is over, and the detection of the subsequent trapezoidal digital signal is initiated. The "dead time" is a time required for the detector 30 to recover from receipt of a first signal until a second signal can be received. When viewed in terms of the trapezoidal digital signal, the dead time end point of the detector 30 corresponds to the time point at which the amount of decrease of the signal on the falling-side sloped line segment exceeds the threshold T. When the threshold T to be set by the peak detection unit 62 is set to a large value, the end point of the dead time of the first signal delays, resulting in an increase in the time (dead time) during which the subsequent signal cannot be measured.

Here, as one example of a wave height distribution diagram (energy spectrum histogram), a wave height distribution diagram of an actual measurement of a brass sample is shown in FIG. 6. Each spectrum A-D in the figure is a spectral distribution when the value of the threshold T is changed as shown below (spectrum E will be described later).

Spectrum A: Peak detection threshold T≈160 eV
Spectrum B: Peak detection threshold T≈320 eV
Spectrum C: Peak detection threshold T≈400 eV
Spectrum D: Peak detection threshold T≈480 eV Each spectrum has a large X-ray peak at near 10 KeV. And in the spectrum A, a large background has occurred at around 10 KeV to 14 Key. In the spectrum B, a medium background has occurred at around 10 KeV to 12 KeV. In the spectrum C, a small background has occurred at around 10 KeV to 11 KeV. On the other hand, in the spectrum D, little background has occurred.

In other words, the background is higher at a smaller threshold T for peak detection, and the background is lower at a larger threshold T. An analysis of the reason for the high background at the smaller setting of the peak detection threshold T revealed that it was due to the fact that the trapezoidal wave digital signal in which the earlier trapezoidal wave digital signal was overlapped with the later trapezoidal wave digital signal and piled up was counted as the signal of the X-ray energy E.

FIG. 7 is a schematic diagram describing a piled-up trapezoidal wave digital signal. The horizontal axis represents a time axis, and the vertical axis represents a peak value of the trapezoidal wave digital signal output from the waveform conversion digital filter 61, that is, a value corresponding to the X-ray energy E. When the incident interval between the earlier trapezoidal wave digital signal U1 (amplitude S1) and the later trapezoidal wave digital signal U2 (amplitude S2) is short and these waveforms overlap (pile-up), the later trapezoidal wave digital signal U2 may be read as a trapezoidal wave digital signal with a slightly larger amplitude (wave height) S2' instead of the original amplitude (wave height) S2 due to the influence of the falling-side sloped line segment of the earlier trapezoidal wave digital signal U, resulting in a signal being counted as a peak value (X-ray energy) larger than the original peak value of the trapezoidal wave digital signal U2.

Therefore, it is considered that the piled-up trapezoidal wave digital signal U2 is counted in the X-ray energy range in which no signal is originally present in the energy spectrum and appears as a background signal by counting the piled-up trapezoidal wave digital signal U2 during the measurement with the histogram memory 63.

Referring again to the wave height distribution diagram in FIG. 6, since almost no background has occurred in the spectrum D, the influence of the piled-up trapezoidal wave digital signal U2 can be suppressed by setting the peak detection threshold T in the peak detection unit 62 to the extent that no background occurs. In other words, background can be suppressed by setting the peak detection threshold T so that the trapezoidal wave with the wave height width indicated by "a" is not counted under the influence of the pile-up in FIG. 7.

However, when the peak detection threshold T is set to a large value, the end point of the dead time is delayed as described above, resulting in an increase in the dead time during which the subsequent trapezoidal wave digital signal cannot be measured, which makes it difficult to measure more X-rays.

Therefore, the purpose of the present invention is to provide a signal processing device for X-ray analysis capable of suppressing an increase in the effect of background due to piled-up signals and suppressing an increase in a dead time during which an X-ray measurement cannot be performed.

Means for Solving the Problems

A signal processing device for X-ray analysis according to the present invention made to solve the above-described problems includes:
- a differentiating circuit configured to convert a plurality of staircase wave signals detected by an X-ray detector into differential wave signals;
- a digital filter configured to convert the differential wave signals into trapezoidal wave signals or triangular wave signals; and
- a peak detection unit configured to discriminate and count a peak value extracted from peak portions of the trapezoidal wave signals or the triangular wave signals,
- wherein the peak detection unit is set such that a rising threshold Tu to be compared with a signal of a rising-side sloped line segment and a falling threshold Td to be compared with a signal of a falling-side sloped line segment in the trapezoidal signal or the triangular wave signal have a relation of Tu>Td, and
- wherein the peak detection unit selects the trapezoidal signal or the triangular wave signal to be counted from the converted trapezoidal signal or the converted triangular wave signal, based on the rising threshold Tu, and terminates detection of the peak portion of the trapezoidal signal or the triangular wave signal, based on the falling threshold Td.

Here, it is preferable that a ratio of the rising threshold Tu to the falling threshold Td be within a range of 2:1 to 4:1.

Effects of the Invention

In the present invention, a rising threshold Tu to be compared with the shift amount (amount of increase) of the signal in the rising-side sloped line segment of a trapezoidal wave (unless otherwise specified, in the following description, it is referred to as "trapezoidal wave" including a "triangular wave") and a falling threshold Td to be compared with the shift amount (amount of decrease) of the signal in the falling-side sloped line segment are set separately, and the rising threshold Tu is set to be larger than the falling threshold Td. With this, the peak detection unit determines whether it is a trapezoidal wave to be counted as a signal by comparing it with the rising threshold Tu, which is the larger threshold relative to the increase in the width of the signal (wave height) in the rising-side sloped line segment, and in the case of a trapezoidal wave with a signal (wave height) equal to or lager than the rising threshold Tu, the peak portion is detected, and the peak value extracted from the peak portion is discriminated and counted. In the trapezoidal wave (the counted trapezoidal wave) for which the peak portion has been detected, the amount of decrease of the signal (wave height) in the falling-side sloped line segment after the peak is compared with the falling threshold Td, which is a smaller threshold. When the amount of decrease of the signal has exceeded by the falling threshold Td or more, it is recognized that the peak of the trapezoidal wave has passed, and the peak detection for the trapezoidal wave is terminated.

Since the falling threshold Td is set to be smaller than the rising threshold Tu, the peak exceeding can be detected earlier than when the rising threshold Tu and the falling threshold Td are set to be the same threshold T, thereby shortening the dead time, which makes it possible to expedite the detection of the subsequent X-rays. As for the rising threshold Tu, it can be set to be large enough to cause the background to disappear (see the spectrum D in FIG. 6). Therefore, according to the present invention, it is possible to eliminate the background by setting the rising threshold Tu such that the piled-up trapezoidal wave digital signal will not be counted and also possible to measure more X-ray measurements by shortening the dead time by setting the falling threshold Td small.

In the above-described invention, the ratio of the rising threshold Tu to the falling threshold Td is preferably set within a range of 2:1 to 4:1. The larger the amplitude (wave height) of the trapezoidal wave digital signal, the longer the rise time and the fall time become. Therefore, it is possible to make a well-balanced adjustment by setting the ratio to be larger for the range with a large wave height and the ratio to be smaller for the range with a small wave height, depending on the X-ray energy range of the measurement range.

EMBODIMENTS FOR CARRYING OUT THE INVENTION

Hereinafter, some embodiments of the present invention will be described with reference to the attached drawings. Note that the present invention is not limited to the embodiments described below but includes various embodiments to the extent that they do not deviate from the gist of the present invention.

Figure 1:
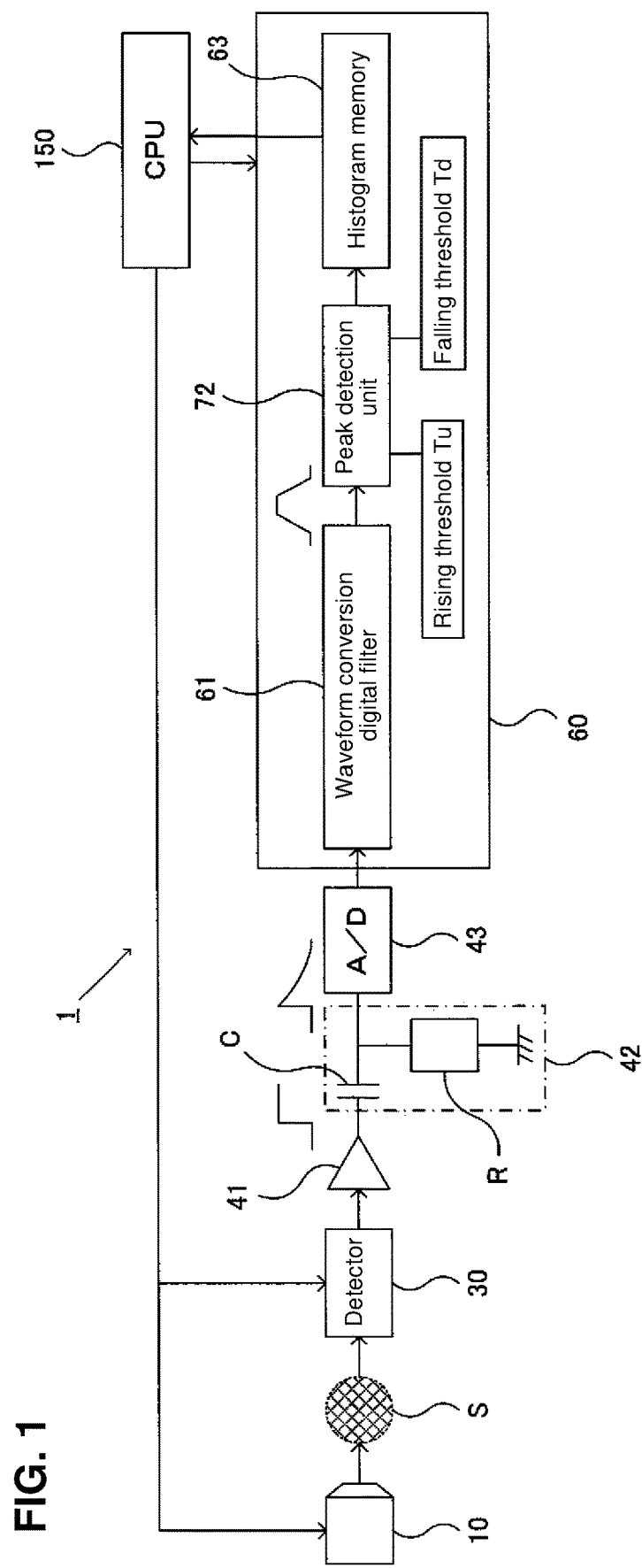
FIG. 1 is a schematic configuration diagram describing an energy-dispersive type X-ray fluorescence analysis device using a signal processing device for X-ray analysis, which is one example of the present invention.

FIG. 1 is a diagram showing a schematic configuration of an energy-dispersive type X-ray fluorescence analyzer using a signal processing device for X-ray analysis, which is one embodiment of the present invention. The energy-dispersive type X-ray fluorescence analyzer 1 is provided with an X-ray tube 10, an energy-dispersive type spectrometer (detector) 30, a preamplifier 41, a differentiating circuit 42, an A/D converter 43, an FPGA 60 (signal processing device for X-ray analysis) composed of a waveform conversion digital filter 61, a peak detection unit 72, and a histogram memory 63, and a CPU 150 for controlling the X-ray tube 10, the energy-dispersive type spectrometer 30, and the FPGA 60.

Figure 3:
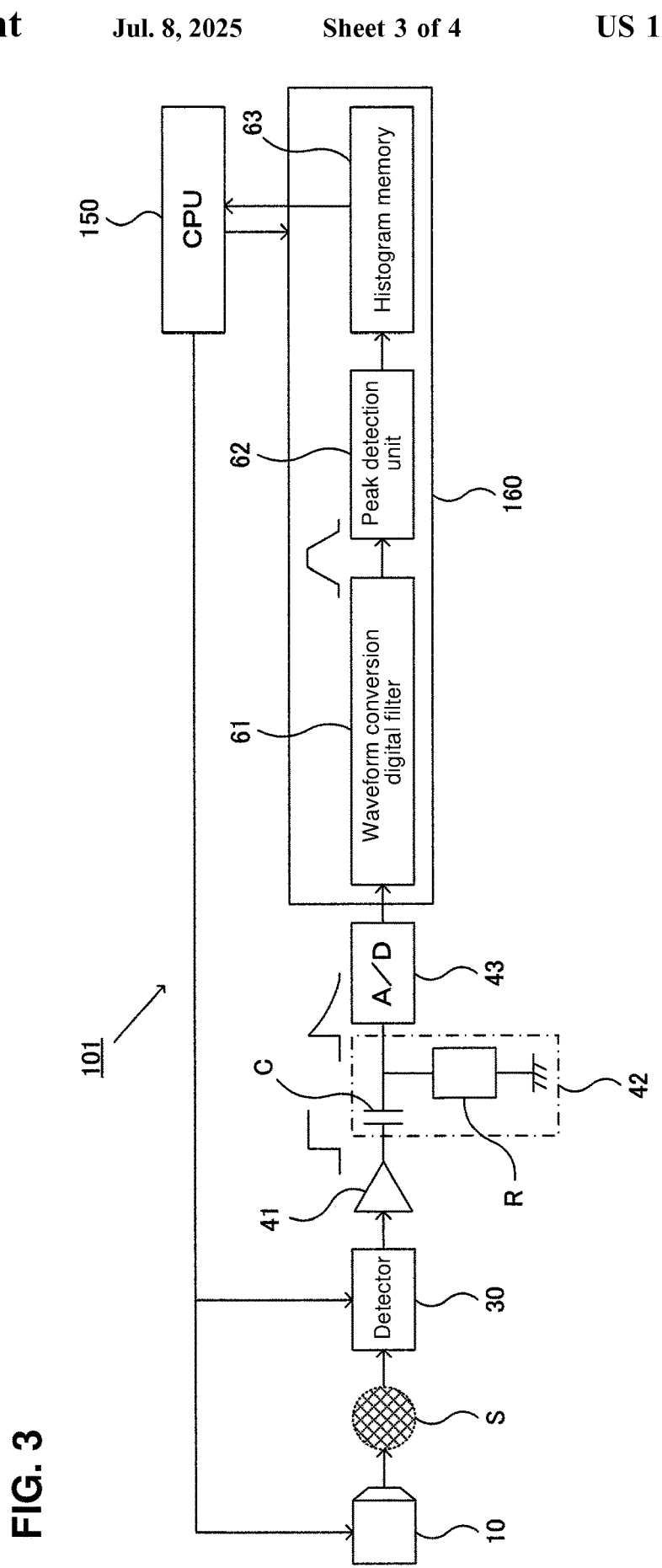
FIG. 3 is a schematic configuration diagram describing a conventional energy-dispersive type X-ray fluorescence analyzer.
Figure 4:
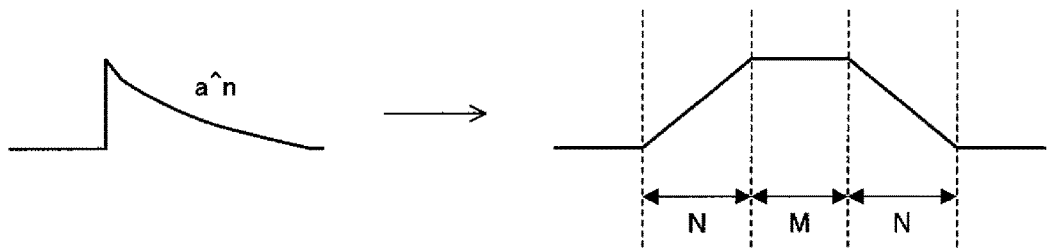
FIG. 4 is a diagram describing the relation between a differential wave and a trapezoidal wave.
Figure 5:
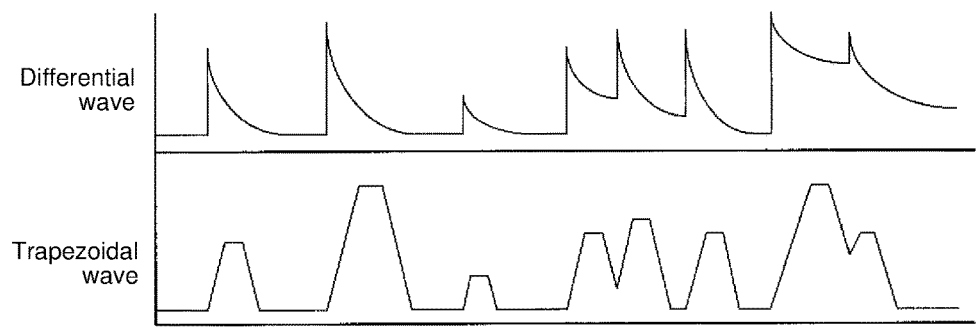
FIG. 5 is a waveform diagram schematically showing a differential wave digital signal to be input to a digital filter and a trapezoidal wave digital signal to be output after waveform conversion.

Note that in the energy-dispersive type X-ray fluorescence analyzer 1, a portion having the same configuration as that of the conventional energy-dispersive type X-ray fluorescence analyzer 101 described with reference to FIG. 3 is assigned by the same reference symbol. In other words, the energy-dispersive type X-ray fluorescence analyzer 1 adopts basically the same configuration except that the FPGA 160 of a conventional device is replaced by the FPGA 60, more specifically, the peak detection unit 62 of the FPGA 160 is replaced by the peak detection unit 72 of the FPGA 60. Therefore, some descriptions of the constituent portions indicated by the same reference symbol are omitted to avoid duplication, and the changed portions are described in detail hereinafter.

Now, the peak detection unit 72 of the energy-dispersive type X-ray fluorescence analyzer 1 of the present invention differs from the peak detection unit 62 of a conventional device in which thresholds are not described in that two thresholds, i.e., a rising threshold Tu and a falling threshold Td, are used.

In the peak detection unit 72, in addition to perform removal of noise, removal of background caused by a piled-up trapezoidal wave is performed based on the rising threshold Tu and the falling threshold Td, and the shortening of a dead time is performed. Therefore hereinafter, these removal processing will be described.

Figure 2:
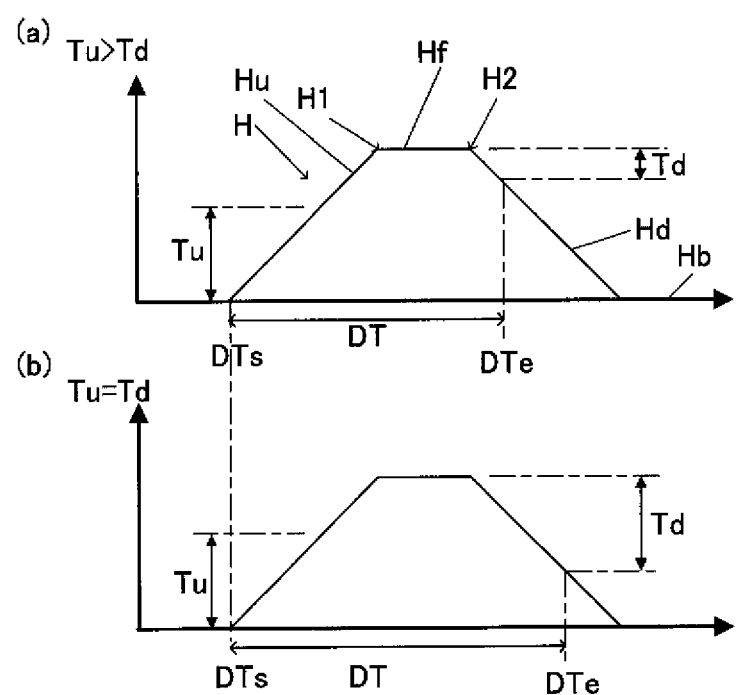
FIG. 2 is a schematic diagram describing the relation between a trapezoidal wave, a rising threshold Tu, and a falling threshold Td.

FIG. 2 is a schematic diagram describing the relation between a trapezoidal wave digital signal H to be input from the waveform conversion digital filter 61 to the peak detection unit 72, a rising threshold Tu, and a falling threshold Td. In FIG. 2, (a) shows a case in which thresholds are set to satisfy Tu>Td, and (b) shows a case in which thresholds are set to satisfy Tu=Td for comparison.

The trapezoidal wave digital signal H to be input is composed of a rising-side sloped line segment Hu, an upper-side line segment Hf (peak segment), and a falling-side sloped line segment Hd. The difference between the upper-side line segment Hf as the maximum height and the base line (lower-side line segment) Hb corresponds to the amplitude (peak value) of the trapezoidal wave digital signal.

The rising threshold Tu is a threshold to be compared at a part of the rising-side sloped line segment Hu (portion where the wave height increases) of the trapezoidal wave H. When a first trapezoidal wave H is input, and the peak detection unit 72 detects that the shift amount (amount of increase) of the rising-side sloped line segment Hu from the baseline Hb is equal to or greater than the rising threshold Tu, the peak detection unit 72 recognizes that it is not a peak of a signal to be removed as noise at that time point but a peak of the trapezoidal wave to be counted.

Then, based on the change in the wave height at each point on the rising-side sloped line segment Hu, the peak detection unit 72 detects an upper-side line segment start point H1, which is a bending point from the rising-side sloped line segment Hu to the upper-side line segment Hf, recognizes that it is the peak portion by detecting the upper-side line segment H which is the maximum height, and extracts the peak value (peak top value). The peak value to be extracted may be the peak value of the upper-side line segment start point H1, the peak value of the other point on the upper-side line segment, or an average value of peak values of a plurality of points on the upper-side line segment.

The peak detection unit 72 detects the upper-side line segment end point H2 which is a bending point from the upper-side line segment Hf to the falling-side sloped line segment Hd based on the change in the wave height and further detects each point on the falling-side sloped line segment Hd of the trapezoidal wave H based on the change in the wave height.

The falling threshold Td is a threshold to be compared at the portion (portion at which the wave height decreases) of the falling-side sloped line segment Hd of the trapezoidal wave H. When the peak detection unit 72 detects that the shift amount (amount of decrease) of the falling-side sloped line segment Hd from the upper-side line segment Hu is equal to or greater than the falling threshold Td, it recognizes that the peak of the trapezoidal wave H has passed at that point of time and terminates the peak detection for this trapezoidal wave H. That is, it is determined as the end point DTe of the dead time DT of the first trapezoidal wave started from the start point DTs of the trapezoidal wave H.

Thereafter, a process of detecting the rising-side sloped line segment Hu of the subsequent trapezoidal wave is initiated. In other words, the peak detection unit 72 detects, based on the change in the wave height, the occurrence state of a bending point from the falling-side sloped line segment Hd to a rising-side sloped line segment Hu where the wave height increases (even before reaching the base line Hb). Then, based on the change in the wave height, the bending point to the rising-side sloped line segment Hu is detected. When the change to the rising-side sloped line segment is detected, the wave height of the bending point is used as the base height, and in the same manner as when the first trapezoidal wave is input, the rising threshold Tu and the shift amount (amount of increase) are compared to determine whether it is a signal to be removed as noise or whether it is the start of a peak of a trapezoidal wave to be counted. As previously mentioned, the background can be suppressed by selecting a value at which the piled-up trapezoidal wave (of the wave height indicated by "a" in FIG. 7) can be removed and setting it as the rising threshold Tu (for example, the threshold at the spectrum D in FIG. 6).

On the other hand, the dead time end point DTe can be set ahead by setting the falling threshold Td to a smaller value. FIG. 2 shows an example of a case in which the rising threshold Tu is set to a value to the extent that it is sufficient to suppress background, and Td is set to satisfy Tu>Td and a case in which Td is set to satisfy Tu=Td for comparison. In the case of Tu>Td, the dead time end point DTe is clearly set ahead. With this, the dead time DT from the dead time start point DTs at which the wave height of the trapezoidal wave H begins to rise to the dead time end point DTe is shortened.

Therefore, by setting the rising threshold Tu to a value to the extent that a piled-up trapezoidal wave is not counted and setting the falling threshold Td to a value smaller than Tu, the effect of background can be eliminated, and the dead time DT can be shortened, which allows more X-rays to be measured.

Here, referring back to FIG. 6, in the figures, in the spectra A to D, the peak detection threshold T was set to the same value for the rising threshold Tu and the falling threshold Td (Tu=Td=160 eV-480 eV). In contrast, in the spectrum E, the threshold T was set to be Tu>Td with the following values.

Spectrum E: Rising threshold Tu≈480 eV
Falling threshold Td≈160 eV

Specifically, the rising threshold Tu was set to 480 eV with reference to the spectrum D which has the best reduction of background, and Td was set to 180 eV so that the ratio of Tu:Td becomes 3:1

As a result, it was confirmed that in the spectrum E, as in the spectrum D (Tu=Td=480 eV), the influence of pile-up can be suppressed, and no background can be generated. Moreover, as a result of the separate measurement of the dead time for the spectrum E, it was confirmed that the dead time was reduced by 8 to 16 nanoseconds as compared with the dead time for the spectrum D.

Figure 6:
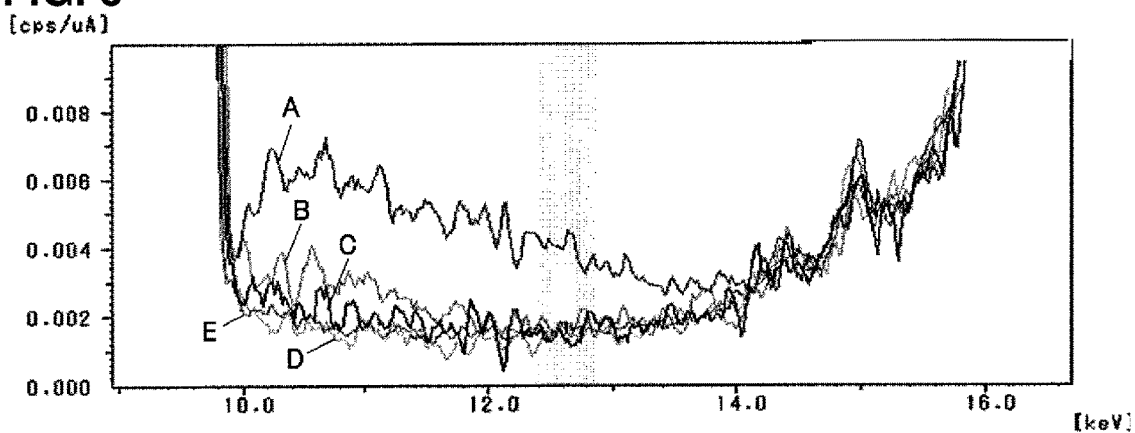
FIG. 6 is a wave height distribution diagram (energy spectrum histogram) of an actual measurement of a brass sample.
Figure 7:
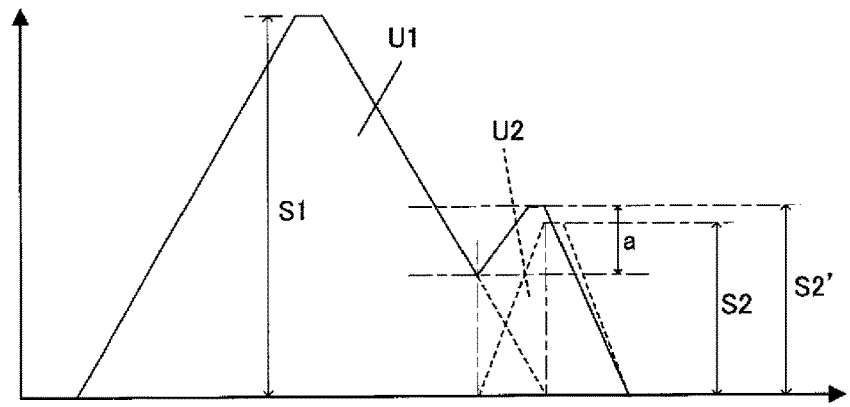
FIG. 7 is a schematic diagram describing a piled-up trapezoidal wave digital signal.

Note that the measurement target material in FIG. 6 is brass, and the energy spectrum was measured in the range of 10 to 20 eV. However, depending on the target material, it may be required to measure in the range of 0 to 40 eV, or even higher, or in a smaller energy range of 0 to 10 eV. The ratio of Tu to Td is preferably set to a value suitable for the energy range to be measured. Specifically, since the rise time and the fall time increase as the wave height (X-ray energy) increase, in order to efficiently shorten the dead time, it was confirmed that the two effects of the reduction of background and shortening of the dead time can be achieved in a balanced manner by setting Tu:Td to be approximately 4:1 for the measurement in the higher energy range and by setting Tu:Td to be approximately 2:1 for the measurement in the lower energy range.

Although the above description was directed to the case of converting to a trapezoidal wave digital signal, the present invention can be applied in the same manner even to the case of converting to a triangular wave digital signal. Needless to say, other modifications can be made as appropriate within a range not deviating the gist of the present invention.

INDUSTRIAL AVAILABILITY

The present invention can be utilized for a signal processing device for X-ray analysis, such as, e.g., an X-ray fluorescence spectrometer.

DESCRIPTION OF REFERENCE SYMBOLS

10: X-ray tube
30: Energy-dispersive type spectrometer (detector)
42: Differentiating circuit
43: A/D converter
60: FPGA (signal processing device for X-ray analysis)
61: Waveform conversion digital filter
62: Peak detection unit
63: Histogram memory
Tu: Rising threshold
Td: Falling threshold
H: Trapezoidal wave
Hu: Rising-side sloped line segment
Hf: Upper-side line segment (peak segment)
Hd: Falling-side sloped line segment
DT: Dead Time
DTe: End point of time of dead time

The invention claimed is:

1. A signal processing device for X-ray analysis, comprising:
a differentiating circuit configured to convert a plurality of staircase wave signals detected by an X-ray detector into differential wave signals;
a digital filter configured to convert the differential wave signals into trapezoidal wave signals or triangular wave signals; and
a peak detection unit configured to discriminate and count a peak value extracted from peak portions of the trapezoidal wave signals or the triangular wave signals,
wherein the peak detection unit is set such that a rising threshold Tu to be compared with a signal of a rising-side sloped line segment and a falling threshold Td to be compared with a signal of a falling-side sloped line segment in the trapezoidal signal or the triangular wave signal have a relation of Tu>Td, and
wherein the peak detection unit selects the trapezoidal signal or the triangular wave signal to be counted from the converted trapezoidal signal or the converted triangular wave signal, based on the rising threshold Tu, and terminates detection of the peak portion of the trapezoidal signal or the triangular wave signal, based on the falling threshold Td.

2. The signal processing device for X-ray analysis as recited in claim 1,
wherein a ratio of the rising threshold Tu to the falling threshold Td is within a range of 2:1 to 4:1.

* * * * *